United States Patent [19]

Fisher et al.

[11] Patent Number: 5,354,600
[45] Date of Patent: Oct. 11, 1994

[54] FORTIFIED PRESSURE SENSITIVE ADHESIVE

[75] Inventors: Dennis K. Fisher; Brian J. Briddell; Stephen J. Eder, all of Jackson, Mich.

[73] Assignee: Adco Products, Inc., Michigan Center, Mich.

[21] Appl. No.: 61,809

[22] Filed: May 17, 1993

[51] Int. Cl.$^5$ ............................................. B32B 7/02
[52] U.S. Cl. .................................. 428/215; 428/355; 526/318
[58] Field of Search ................. 428/215, 355; 526/279, 526/318

[56] References Cited

U.S. PATENT DOCUMENTS

| | | | |
|---|---|---|---|
| Re. 24,906 | 12/1960 | Ulrich | 526/328.5 |
| 3,617,362 | 11/1971 | Bemmels et al. | 428/355 |
| 3,729,338 | 4/1973 | Lehmann et al. | 428/355 |
| 4,181,752 | 1/1980 | Martens et al. | 427/54.1 |
| 4,223,067 | 9/1980 | Levens | 428/308 |
| 4,716,194 | 12/1987 | Walker et al. | 526/279 |
| 4,931,347 | 6/1990 | Slovinsky et al. | 428/192 |
| 5,183,833 | 2/1993 | Fisher et al. | 522/182 |

OTHER PUBLICATIONS

*Handbook of Adhesives* edited by Irving Skeist, Van Nostrand Reinhold, New York, 1989, pp. 568, 569.
"Dow Research Shows Functionalized Copolymer Resins Help Auto Topcoats Resist Environmental Acid Etch", J. L. Potter, W. R. Hunt and P. W. Barnett, Paint & Coatings Industry, pp. 28–29, Apr. 1992.
"DuPont's New Generation Of One-Component Clearcoats Shines On The Automotive Horizon", Paint & Coatings Industry, pp. 24–28, Apr. 1992.
"Organofunctional Silanes-A Profile", Union Carbide Silicones, pp. 1–37, 1983.

*Primary Examiner*—Romulo H. Delmendo
*Attorney, Agent, or Firm*—Joan I. Norek

[57] ABSTRACT

A fortified pressure sensitive adhesive is comprised of a polymerization product of, or a polymeric composition derived from a formulation comprising at least one non-tertiary acrylic acid alkyl ester formed from a primary or secondary alcohol, an organofunctional silane, wherein said organofunctional silane is present in said formulation in an amount sufficient to increase the adhesive characteristics of the pressure sensitive adhesive, and an ethylenically-unsaturated dimer, wherein the ethylenically-unsaturated dimer is present in the formulation in an amount sufficient to increase the adhesive characteristics of the pressure sensitive adhesive.

14 Claims, No Drawings

FORTIFIED PRESSURE SENSITIVE ADHESIVE

TECHNICAL FIELD OF THE INVENTION

The present invention is in the technical field of pressure sensitive adhesives, including pressure sensitive adhesives at least partially prepared by photopolymerization. The present invention is more particularly directed to pressure sensitive adhesives having improved adhesion, particularly to silane-modified acrylic/melamine paint systems.

BACKGROUND OF THE INVENTION

Pressure sensitive adhesives are widely used for a multitude of purposes, such as various sealing and attachment purposes. Pressure sensitive adhesives may be formed as supported systems, for instance as an adhesive layer supported by a foundation material, which foundation may be a flexible support or carrier, or a rigid body. Pressure sensitive adhesives may also be formed as double-faced supported systems, for instance with a flexible or rigid carrier faced on both sides with an adhesive layer. Such a carrier may itself be nonadhesive, although for certain applications, discussed in more detail below, the carrier supporting the two adhesive layers has itself some pressure sensitive adhesive qualities. Pressure sensitive adhesive layers vary widely as to thickness, from a fraction of a rail ($10^{-3}$ inch) to much greater thickness.

Pressure sensitive adhesives formed substantially from acrylate copolymers are well known in the art. For instance, certain acrylate copolymers which are both normally tacky and yet possess a reasonable degree of internal strength are disclosed in U.S. Pat. No. Re 24,906 (Ulrich) which reissued from original U.S. Pat. No. 2,884,126 in December 1960, incorporated hereinto by reference. Such copolymers are comprised of certain non-tertiary acrylic esters copolymerized with monomers having polar groups, for instance acrylic acid, methacrylic acid, acrylamide methacrylamide, itaconic acid, and the like. Such non-tertiary acrylic esters generally are acrylic acid esters of non-tertiary alkyl alcohols, such alcohols having up to 14 carbons, and further having an average of from 4 to 12 carbons. Small amounts of other monomers may also be incorporated into such polymers. Such adhesive polymers, referred to herein at times as acrylic ester polymer type or acrylic ester polymer(s), are commonly formed as supported systems on a flexible support sheet or tape.

Photopolymerization of pressure sensitive adhesive materials of the acrylic ester polymer type is generally known. While such acrylic ester polymers may be prepared by solution or emulsion polymerization techniques, there are manufacturing disadvantages in preparing the polymers in such fashion. If solution polymerization is used, the solvent must be removed, typically by drying it off at elevated temperatures, which involves the use of significant processing equipment and may create environment and safety hazards. Emulsion polymerization also requires the removal of a liquid. The acrylic ester polymers must be separated from the emulsion liquid(s) used, which often would be primarily water. The emulsified acrylic ester polymers may be isolated by precipitation, rather than by drying off the water, which may reduce the processing equipment required. In either instance, however, the emulsion polymerization product will contain some amount of the surfactant used in the polymerization which may be detrimental to the product's end use, and the additional polymer-isolation steps are not entirely avoided.

Photopolymerization of the monomers neat, without any diluent that requires removal after the polymerization, provides processing advantages in the manufacture of pressure sensitive adhesives. For instance, Belgium Patent No. 675,420, published in May of 1966, discloses a process for the fabrication of adhesive tapes by polymerizing the monomers directly on the carrier using photopolymerization through exposure of the monomers, containing a photoinitiator, to ultraviolet radiation. The liquid acrylic monomer(s), which may be thickened, are applied to the carrier using a doctor blade or roller coating, or by spraying, and then polymerized, avoiding any post-polymerization removal of diluent or other extraneous material. Exemplified is a typical pressure sensitive formulation, a mixture of ethyl hexyl acrylate and acrylic aid, that is coated onto a cellulose acetate sheet and is passed into a tunnel, from which oxygen has been excluded, the upper wall of which is formed of quartz glass, and is irradiated with a source of ultraviolet radiation through such upper wall. The source of ultraviolet radiation used is a high pressure mercury vapor lamp.

It is also known to prepare a pressure sensitive adhesive tape by first forming a prepolymer of at least some of the monomers to be used, and then forming a coating of such prepolymer of the desired thickness before completion of the polymerization. For instance, U.S. Pat. No. 3,729,338 (Lehmann et al.) discloses the preparation of a low molecular weight, spreadable composition which is applied to the support material, to which composition may be added a small amount of catalyst and/or poly-functional cross-linking monomer, prior to the completion of the polymerization by heat curing. Such low molecular weight polymer, or prepolymer, is thicker or more viscous than the liquid monomers and hence is more easily applied as a coating to the support material before polymerization is completed.

Pressure sensitive adhesive tapes that are both relatively thick and are comprised of layers of acrylate esters have been prepared using photopolymerization techniques. For instance, U.S. Pat. No. 4,223,067 (Levens) describes the preparation of a pressure sensitive adhesive tape that may be from 0.2 to 1.0 mm thick. Such tape is comprised of a pressure sensitive adhesive matrix which further contains glass microbubbles, which optionally may have one or both of its sides coated with an untilled pressure sensitive adhesive. The photopolymerization is accomplished by exposure to ultraviolet BL and BLB lamps. Where a laminate of both filled and untilled layers was prepared, the separate polymerized layers were laminated together using a pressure roll.

The use of BL and BLB lamps in particular for the photopolymerization of acrylic ester polymer type pressure sensitive adhesives is discussed in detail U.S. Pat. No. 4,181,752 (Martens et al.). Such lamps emit ultraviolet radiation that peaks at about 351 nm, and the energy emitted at ultraviolet radiation wavelengths shorter than 300 nm is less than 10 percent of that in the 300 to 400 nm range, and at a distance of about 3 inches have a light intensity in the 300–400 nm wavelength band of about 0.337 milliwatts/cm$^2$. An unduly slow polymerization rate is noted as being disadvantageous to the manufacture of the pressure sensitive adhesive.

The preparation of acrylic ester polymer type pressure sensitive adhesives at least partially by photopolymerization using a source of ultraviolet radiation having a spectral peak at about 310 nm is disclosed in U.S. Pat. No. 5,183,833, Dennis K. Fisher and Brian J. Briddell, issued on Feb. 2, 1993, incorporated hereinto by reference. Using UV-B lamps, such as 20 watt Westinghouse FS-20 lamps, a pressure sensitive adhesive system having an inner filled layer of about 34 mils thickness sandwiched between adhesive layers of 2 to 3 mils thickness was formed. Such pressure sensitive adhesive system had excellent adhesion characteristics, for instance ratings of 61.7 lb in the pluck test, 37.6 lb in the initial breakaway peel test, and 19.1 lb in the initial continuing peel test. A steel panel coated with an exterior finish automotive paint was one of the surfaces used in such tests.

The automotive field uses pressure sensitive adhesives for the application of exterior trim. The adhesive characteristics of a pressure sensitive adhesive is in part dependent on the surface to which it is applied. As the nature of commercial automotive coating materials evolves, the adhesion performance of the pressure sensitive adhesives can diminish. In the instance of new "silane-modified" acrylic/melamine coatings (described below), the reduced adhesion of otherwise superior pressure sensitive adhesives products has been seen.

It is an object of the present invention to provide a fortified pressure sensitive adhesive. It is an object of the present invention to provide a pressure sensitive adhesive having improved adhesion to silane-modified acrylic/melamine coatings. It is an object of the present invention to provide a process for preparing a pressure sensitive adhesive having improved adhesion characteristics, particularly as to its adhesion to silane-modified acrylic/melamine coatings. It is an object of the present invention to provide such a pressure sensitive adhesive, and process for the preparation of a pressure sensitive adhesive, particularly a pressure sensitive adhesive of a relatively thick pressure sensitive adhesive system. These and other objects of the present invention are described in more detail below.

DISCLOSURE OF THE INVENTION

The present invention provides a fortified acrylic ester polymer pressure sensitive adhesive having improved or fortified adhesion characteristics which contains an organofunctional silane and/or a copolymerizable dimer.

The present invention also provides a method of preparing an acrylic ester polymer pressure sensitive adhesive of improved or fortified adhesion characteristics which contains organofunctional silane and/or a copolymerizable dimer including the step of a least partially photopolymerizing such an acrylic ester polymer pressure sensitive adhesive formulation, particularly by exposure to a source of ultraviolet radiation. The process of the present invention provides the manufacturing advantages of completion of the polymerization to the desired degree of conversion of monomer to polymer at a faster rate without loss of performance properties of the end product, particularly for the manufacture of a relatively thick pressure sensitive adhesive system.

PREFERRED EMBODIMENTS OF THE INVENTION

In preferred embodiment, the fortified acrylic ester pressure sensitive adhesive of the present invention is a facing (fronting or sheathing) layer of a relatively thick supported pressure sensitive adhesive system. For bonding paper sheets or other light-weight objects, a pressure sensitive adhesive system having a thin support layer, for instance a plastic film layer, generally will suffice. The bonding of larger objects, particularly contoured and/or textured objects, requires a thicker supported pressure sensitive adhesive system with a thicker support layer having some degree of elasticity. The elasticity of the support layer gives the pressure sensitive adhesive system the flexibility needed to conform to the surface(s) being bonded, permitting the adhesive facing to more universally contact the surface(s) along the entire length and breadth of the pressure sensitive adhesive sheet or tape being applied. One reason this embodiment is preferred is that thick supported pressure sensitive adhesive systems are routinely employed for difficult bonding applications, and the advantages of the present invention are highly desirable for difficult bonding applications.

The automotive industry's use of pressure sensitive adhesive systems for the attachment of automotive trim items is a formidable bonding application. The automotive industry use requires an extremely durable adherence of such trim items, such as vehicle side moldings, insignia and the like. Formerly these trim items were attached by mechanical means that required perforations in the vehicle body, but this practice causes corrosion problems and is more costly. The stresses normally placed on vehicle trim items over years of vehicle use, including temperature and other outdoor weather conditions and abrasions, are extreme, while common expectations are that the adhesion of trim will endure for the useful life of the vehicle.

The automotive industry not only demands an adhesive system of utmost durability, but also one that can be applied with reasonable ease. For this reason, pressure sensitive adhesive systems are the choice adhesive systems. The pressure sensitive adhesive system must be capable of bonding trim items to an exterior vehicle surface at ambient temperature without undue overpress. It must develop initial adherence rapidly. It must acquire long-term adherence at ambient temperature without any external curing procedures.

The pressure sensitive adhesive systems developed in the past, for instance those disclosed in the some of the patents described above, have heretofore been very acceptable for automotive use. The adherence of a pressure sensitive adhesive is, however, partly dependent upon the substrate surface, the surface to which it is adhered. In the automotive field the substrate surface is the exterior coating of paint. New automotive paints have to a large extent replaced older formulations, and have affected the performance of the pressure sensitive adhesive systems used.

Automotive Paints

The term "paint" (or "paint formulation") as used herein includes paint in its ordinary sense, that is, a mixture of pigment and a suitable liquid vehicle that is reasonably fluid and provides a thin and adherent coating when spread on an appropriate surface. The term "paint" as used herein, and as used in the paint and/or coating industry, also includes other paint-like fluid coating materials. Hence the term "paint" (or "paint formulation") as used herein refers to paints, lacquers, varnishes, base coats, clear coats, and the like, as discussed in more detail below.

Relatively thick pressure sensitive adhesive products are commonly the attachment means of choice for automotive exterior trim, and this use of pressure sensitive adhesives demands extremely enduring adhesion characteristics. Providing a pressure sensitive adhesive with sufficient adhesion properties for automotive exterior-trim attachment is a significant objective in the pressure sensitive adhesive field. This objective has become more challenging to achieve as the automotive industry turns from low solids solution lacquers and the like to low-VOC paint formulations, such as high solids enamels, base coat/clear coat systems, multi-component systems such as two-component urethanes and the like.

An automotive paint or paint formulation is generally a composition(s) that must be sprayable in the environment of a paint spray booth and must contain a constituent, or plurality of constituents, capable of forming a solid film (coating) on a surface. Paint formulations may contain a carrier, which commonly is a liquid vehicle for other constituents of the paint formulation. Such other constituents may be dissolved and/or dispersed in the carrier. In the past, the use of lacquer comprised of high molecular weight polymers dissolved in a solvent (solution lacquers) was not uncommon. Such lacquers were routinely sprayed with a volume of solvent that was from about five to about eight times that of the ultimate coating material(s). This type of lacquer is exemplitive of low solids, and typically high VOC, paint formulations that are not presently favored in the industry. Instead the preferred paint formulations now are those with high solids and low carrier content, or those employing water as at least a significant portion of the carrier.

Paint formulations must include one or more constituents that provide the coating film. Film-forming materials generally are high molecular weight natural or synthetic polymeric materials. The high molecular weight polymers used in solution lacquers are pre-formed polymers, and the high volumes of solvent required for spraying were dictated by such pre-formed polymers, which would form a solution too viscous for efficient spraying if lesser amounts of solvent were used. Lower viscosities can be provided by dispersion of the polymers in the carrier, but dispersions usually require a surface active agent for stability, which is often an undesirable coating constituent and may diminish the film-forming performance of the polymer(s).

To relieve viscosity problems without using dispersion-type formulations, and without diminishing the molecular weight of the polymeric material of the ultimate coating, lower molecular weight compositions that react to form high molecular weight polymers during spraying or after application to the surface being coated have been used. Such systems contain precursors to the ultimate polymeric material providing the coating film. Precursors comprising oligomers or prepolymers that react to form higher molecular weight polymers at elevated temperatures are known. Elevated temperatures for this, or any other purpose, must not reach that which is detrimental to the object being coated. In the automotive field, at the paint spray stage temperatures are kept below about 177° C. to prevent metal buckling and solder movement. Such temperature limitations may diminish the selection of heat-activated precursors or the ultimate molecular weights that can be attained.

Such temperature limitations also create limitations as to the carriers that can be efficiently used in paint formulations. The common use of volatile organic solvent in the past was not arbitrary but instead prescribed by the need for efficient removal of the carrier at relatively moderate drying temperatures.

The trend away from the use of volatile organic solvents in industrial paint formulations, mainly to avoid VOC emissions, has led to an ever increasing use of specialty paint formulations, which are often proprietary formulations, the compositions of which are not publicly disclosed. These speciality paint formulations are low VOC, high solids formulations, and/or use water as the carrier. Some of these specialty paint formulations are comprised of a plurality of components sprayed from separate "pots" to avoid contact between coreactants and/or catalysts until intermingled during spraying. or upon application. These formulations are referred to in the industry as "two-pot", "two-component" and/or "2K" formulations.

The use of speciality paints in the industry, and proprietary specialty paints, has created problems in the pressure sensitive adhesive field, which problems have become more intense for pressure sensitive adhesives to be used on acrylic/melamine paint formulations which are believed to contain silane modifiers. Acrylic/melamine paint formulations have been in use in the automotive field in the past without any significant deleterious effect on the adhesion properties of the pressure sensitive adhesive products used for exterior trim attachment. New acrylic/melamine formulations that are generally one-component(1K) clearcoats and are generally more resistant to environmental etch (an effect of acid rain) have recently been introduced in the automotive field. These new 1K formulations provide resistance to environmental etch that previously seen only in 2K formulations, while eliminating the difficulties and expense inherently demanded by 2K formulations. The mixing of two formulation streams to provide the proper ratio between components in the ultimate coating has been a drawback of 2K formulations. Two-component formulations also require additional mixing equipment and investment in circulating systems. One-component systems provide the same high environmental-etch resistance of the 2K formulations while relieving the problems thereof. In addition, the new 1K formulations do not compromise the mar and scratch resistance of the ultimate coatings. These I K formulations thus are experiencing a notable acceptance and commercial success in the automotive field.

New one-component formulations are described in "Du Pont's New 'Generation of One-Component Clearcoats Shine on the Automotive Horizon", page 24, Paint & Coating Industry, April 1992, and "Dow Research Shows Functionalized Copolymer Resins Help Auto Topcoats Resist Environmental, Acid Etch", pp 28–29, Paint & Coating Industry, April 1992, both of which are incorporated hereinto by reference. An automotive clear coat ("topcoat") my contain an acrylic oligomer, a melamine resin, a catalyst, an ultraviolet radiation absorber, a hindered amine light stabilizer, a flow agent and a solvent or carrier for these components. It is believed that these types of one-component environmental-etch resistant coating formulations also contain a silane component, although the type and amount are not known outside of those privy to such proprietary information. Hence these types of coatings are referred to in the technical field and herein as silane-modified acrylic/melamine formulations and/or coatings. A primary use of such coatings has been as the clearcoat (clear coat or topcoat) of a plurality of paint coats on automotive vehicles.

As seen from the data in the Examples below, adhesion of pressure sensitive adhesives to such silane-modified coatings is less than their adhesion to automotive coatings which formerly predominated in the field. Moreover it is believed that the same or similar adhesion-diminishing effect will be seen if silane modifiers are incorporated into paint formulations other than the acrylic/melamine type and such other paint formulations are used as clearcoats. Moreover, while the automotive field is a major commercial field for both such silane-modified coatings and trim applied with pressure sensitive adhesive systems, the advantages being derived in the automotive field foreshow the adoption of such coatings and adhesive systems by other industries.

The Photopolymerization Process

The preferred preparation method is a photopolymerization method and in more preferred embodiment the present invention includes a photopolymerization process entailing the exposure of the fortified acrylic acid ester pressure sensitive adhesive formulation to a source of ultraviolet radiation having certain characteristics. Such characteristics arc that a substantial portion of its energy, particularly its ultraviolet energy, is the wavelength range of from 280 to 350 nm, and that the light intensity, as measured at the surface of the formulation being polymerized, is of low intensity, preferably no more than about 4.0 milliwatts/cm$^2$. A preferred source of such ultraviolet radiation that is readily commercially available arc fluorescent "UV-B" lamps, also referred to as sunlamps, such as those available from North American Phillips under the trade designations of FS-20 and FS40. These Imps were previously made and sold by the Westinghouse Company. Later references to such bulbs herein will use the "Westinghouse" designation which appears on the bulbs actually used in the Examples and Comparative Examples, which were "FS-20, 12-UVB" bulbs (about 12 inches in length). These are tubular fluorescent bulbs which are coated on the inside with certain phosphors that fluoresce and radiate a considerable mount Of ultraviolet radiation energy in the 290 to 350 nm wavelength band, and have a spectral power peak at about 310 nm wavelength. Within the ultraviolet wavelength band of 200 to 400 nm, about 22 percent of the energy or power radiated is of wavelengths less than 300 nm and the remainder, or about 78 percent of the radiated energy or power, is of wavelengths greater than 300 nm. One sample of a Westinghouse sunlamp FS-20 was measured at a reference plane of one meter from the lamp at intervals of 10 nm from 200 to 400 nm and it was determined that 21.7 percent of the measured energy was of the wavelengths of from 200 to 300 nm and the remaining 78.3 percent was of the wavelengths of from 300 to 400 nm.

Such UV-B lamps emit about 90 percent of their ultraviolet radiation in the wavelength band of from about 280 to 350 nm, and it is preferred that the source of ultraviolet radiation emit at least about 80 percent of its UV radiation in the wavelength band of from 280 to 350 nm. Of the energy emitted in the wavelength band of from 280 to 350 mn, such UV-B lamps emit about 22 percent thereof in the wavelength band of from 280 to 300 nm and about 88 percent thereof in the wavelength band of from 300 mn to 350 mn. Of the energy emitted in the wavelength band of from 280 to 350 nm, such UV-B lamps emit about 85 percent thereof in the more narrow defined wavelength band of from 290 to 335 nm, and it is preferred that the source of ultraviolet radiation emit at least 70 percent of its energy from the 280 to 350 nm wavelength band in the wavelength band of from about 290 to 335 nm. The use of such type of UV-B lamps herein described as the source of ultraviolet radiation is itself an additional preferred embodiment of the invention.

Such UV-B bulbs have a wattage of about one watt per inch of linear length, the FS-20 lamp being a 20 watt bulb which is about two feet in length, and the FS-40 lamp being a 40 watt bulb approximately twice as long as the FS-20 lamp. The intensity of the radiation emitted from such a generally cylindrical source of radiation will vary inversely with the distance from the lamp. At a distance of about 6 inches from the lamp, the UV-B lamp is well within an intensity maximum of up to about 4.0 milliwatts/cm$^2$ at the formulation surface, and further is within the intensity range of from 0.1 to 4.0 milliwatts/cm$^2$.

As long as the fortified acrylic ester pressure sensitive adhesive formulation is disposed so that exposure of such formulation to the particular ultraviolet radiation is possible, the present photopolymerization process can be applied. The formulation may be set down as a layer on a flexible carrier or even a rigid body (for instance the support layer of a supported system), and be exposed to the radiation source from above; it may be coated onto the bottom of such carrier or body and be exposed to the radiation source from below. It may be sandwiched between two sheets of material sufficiently transparent to ultraviolet radiation to permit exposure to the source of radiation simultaneously or alternately from above or below. It may be set down and polymerized on another layer formed of a similar or different pressure sensitive adhesive formulation.

The fortified acrylic ester pressure sensitive adhesive formulation may be polymerized as a reasonably thick layer in and of itself, for instance up to about a thickness of 60 mils, or a thick product may be composed of a plurality of layers, each separately photopolymerized, each layer subsequent to the first being set down on the material already photopolymerized.

The avoidance of oxygen at the site of the photopolymerization may be achieved in any manner that does not interfere with photopolymerization. For instance, the formulation to be photopolymerized may be sandwiched between two plates thereby excluding oxygen-containing air from the site of the polymerization. The formulation may be placed in a vessel or chamber that has been purged with an oxygen-free gas, such as nitrogen, and such an oxygen-free gas may be maintained as the atmosphere therein during the photopolymerization.

Since many techniques for excluding oxygen impose a plate or wall between the formulation to be polymerized and the source of radiation, it is important to choose a plate or wall of appropriate material. The combination of the initially emitted radiation and any material disposed between the radiation source and the formulation being photopolymerized should provide radiation at the surface of the formulation (the effective photopolymerization radiation) having the wavelength characteristics set forth above. In other words, any material disposed between the fortified acrylic ester pressure sensitive adhesive formulation and the ultraviolet lamp(s) used is potentially a filter for the ultraviolet radiation to a degree, and the effective photopolymerization radiation, as to its wavelength and energy characteristics set forth above, is determined by the radiation source and any filter effect present during polymerization.

The UV-B bulbs described above provide radiation of the desired wavelength characteristics and such radiation is not inappropriately altered when quartz glass is disposed between the lamps and the formulation. Materials other than quartz may alter to an undesirable degree the radiation from the UV-B lamps even though such materials may be reasonably transparent to visible light. Alternatively, the filter effect of a plate or wall, or a separate filter, may be used to so alter the radiation characteristics of an otherwise unsuitable lamp to provide a source of radiation within the present invention.

While the above-described photopolymerization process is a preferred method of preparing the fortified acrylic ester pressure sensitive adhesive of the present invention, and is a preferred embodiment of the present invention, the present invention in broad embodiment does not exclude other methods of preparing the fortified acrylic ester pressure sensitive adhesive. The fortified acrylic ester pressure sensitive adhesive may, for instance, be prepared by photopolymerization using other sources of radiation, such as ultraviolet lamps known as BL, BLB and "UV-A" lamps, which have at least about 90 percent of their emissions in the 300 to 400 nm wavelength band and have a peak at about 351 nm. Their wattage per linear length is about the same as the UV-B lamps, and hence their intensity at a given distance is about the same. The fortified acrylic ester pressure sensitive adhesive may also be prepared by solution or emulsion polymerization techniques or other polymerization techniques, despite the disadvantages of such techniques such as those described above.

The Fortified Acrylic Ester Polymer Pressure Sensitive Adhesive Generally

The foundation of many pressure sensitive adhesive formulations have been the copolymers described in the Ulrich U.S. Pat. No. Re. 24,906, noted above, the disclosures of which are hereby incorporated hereinto by reference. Of the various monomers having strongly polar groups, acrylic acid has heretofore often been the chosen monomer for pressure sensitive adhesives. The fortified acrylic ester pressure sensitive adhesive formulation of the present invention in embodiments deviates from the common embodiments of such foundation formulations.

The non-tertiary acrylic acid alkyl esters for the present invention generally should be selected in major portion from those that as homopolymers possess some pressure sensitive adhesive properties or tackiness, such as acrylic acid esters of n-butanol or isobutanol, or alkyl alcohols of greater carbon chain length, such n-pentanol, isopentanol, 2-methybutanol, 1-methyl pentanol, 3-methyl pentanol, 2-ethyl butanol, 3-heptanol, 2,5,5-trimethyl hexanol, 4-ethyl heptanol, 4-ethyl heptanol, 4-methyl octanol, n-decanol, isodecanol, and the like. The alcohols forming the acrylic acid esters may be primary or secondary and their carbon chains may be linear, branched, or cyclic.

In preferred embodiment, the major portion of non-tertiary acrylic acid alkyl esters are formed from alcohols having from about 4 to about 12 carbons, and more preferably from about 6 to about 10 carbons. In further preferred embodiment, the non-tertiary acrylic acid alkyl esters of the fortified acrylic ester pressure sensitive adhesive formulation are formed from alcohols having from about 4 to about 12 carbons, and more preferably from about 6 to about 10 carbons. In even more preferred embodiment, the non-tertiary acrylic acid alkyl esters of the fortified acrylic ester pressure sensitive adhesive formulation are comprised substantially of 2-ethylhexyl acrylate.

In preferred embodiment, the combined amount of non-tertiary acrylic acid alkyl ester and polar-moiety containing monomer units in the fortified acrylic ester pressure sensitive adhesive formulation is comprised of from about 55 to about 100 weight percent of the non-tertiary acrylic acid alkyl ester(s). In more preferred embodiment, the combined amount of non-tertiary acrylic acid alkyl ester and polar-moiety containing monomer units in the fortified acrylic ester pressure sensitive adhesive formulation is comprised of from about 75 to about 100 weight percent of the non-tertiary acrylic acid alkyl ester(s), particularly when the non-tertiary acrylic acid alkyl esters are the preferred species described above.

The possible polar-moiety containing monomers include acrylic acid, itaconic acid, acrylamide, maleic anhydride, beta-carboxyethylacrylate, acrylonitrile, cyanoethylacrylate, hydroxyalkylacrylates, N-substituted acrylamides, similar methacrylic monomers such as methacrylic acid, methacrylamide, cyanoethylmethacrylate, hydroxyalkylmethacrylate, N-substituted methacrylamides, and the like.

Cross-linking of such polymers may be desired for a given end use. Suitable cross-linking agents are molecules having a plurality of ethylenically-unsaturated sites. Cross-linking agents of such type include di- and triacrylates, for instance 1,6-hexanediol diacrylate. Other cross-linking agents may also be used. When a simple cross-linking agent such as 1,6-hexanediol diacrylate is used, the amount of such agent in a formulation is generally from about 0.005 to about 0.5 weight percent, based on total weight of polymer in the fortified acrylic ester pressure sensitive adhesive formulation, and more typically from about 0.01 to about 0.2 weight percent. For the same general effect less of a triacrylate is required than a diacrylate.

The fortified acrylic ester pressure sensitive adhesive also includes an organofunctional silane and/or a polar copolymerizable dimer, as discussed in detail below.

In preparing the fortified acrylic ester pressure sensitive adhesive, the fortified acrylic ester pressure sensitive adhesive formulation may be first prepolymerized to form a prepolymer formulation of higher viscosity than the liquid-monomer containing formulation. Such increased viscosity provides a formulation that often is easier to handle, for instance to apply as a layer to some support material, than the monomer mixture. If desired, a prepolymer may be formed that includes a separate agent for additional thickening of the formulation or for other handling purposes, although seldom would such substances be needed or desired unless the fortified acrylic ester pressure sensitive adhesive itself, as opposed to the entire supported system, is to be relatively thick.

The prepolymer may be further polymerized to the fortified acrylic ester pressure sensitive adhesive of the present invention without any additional substances added thereto, provided it is sufficiently sensitized for photopolymerization if that is the chosen technique, or various substances may be added thereto before completing the polymerization process. For instance, a chemical photoinitiator, or additional photoinitiator, may be added after the prepolymer is formed. Filler, or additional filler, may likewise be added, although again seldom would such substances be needed or desired unless the fortified acrylic ester pressure sensitive adhesive itself, as opposed to the entire supported system, is to be relatively thick. When prepolymers are first formed for an ultimate fortified acrylic ester pressure sensitive adhesive that is cross-linked, typically the cross-linking agent is added only after the formation of the prepolymer. It may also be desirable in some applications to change the proportion of monomer units or to add additional monomer species to the prepolymer prior to completion of the polymerization.

The fortified acrylic ester pressure sensitive adhesive formulation may be partially converted to a prepolymer using the preferred photopolymerization process of the present invention, or using another polymerization technique. Usually it is desirable to avoid diluents that must eventually be removed, and the formation of a prepolymer is done by partially polymerizing a mixture of diluent-free monomers. The prepolymer may, however, be formed by diluent solution or emulsion polymerization techniques when desired. In addition, although the advantages of the present invention have been seen in polymerizations of fortified acrylic ester pressure sensitive adhesive formulations that were free of diluent, this does not exclude the potential for use of the preferred photopolymerization process on formulations that contain some amount of diluent or solvent if the removal of such solvent is either not necessary for the end product or is not of concern to the manufacturer. Nonetheless the preferred photopolymerization process of the present invention has an inherent advantage of being used on diluent-free formulations so as to avoid the problems generally attendant upon the presence of, and the removal of, diluents and solvents.

As mentioned above, the fortified acrylic ester pressure sensitive adhesive formulation that is subject to photopolymerization during the photopolymerization process of the present invention, may be a mixture of monomers, a prepolymer, or a prepolymer to which additional monomers or other substances have been added. The formulation may include an amount of monomer participating in the photopolymerization that is neither a non-tertiary acrylic acid alkyl ester or a polar-group containing monomer, provided that such extraneous monomer(s) does not so effect the properties of the fortified acrylic ester pressure sensitive adhesive product that such product is no longer a normally-tacky pressure sensitive adhesive or unduly interfere with the performance of the present fortified acrylic ester pressure sensitive adhesive.

The inclusion of the suitable photoinitiator, such as 1-hydroxycyclohexyl phenyl ketone or 2,2-dimethoxy-2-phenylacetophenone, which are commercially available from Ciba-Geigy under the trade names respectively of Irgacure 184 and Irgacure 651, or other photoinitiators for ethylenically-unsaturated monomers which are well known in the art, is a typical and convenient method of sensitizing the fortified acrylic ester pressure sensitive adhesive formulation to the ultraviolet radiation when the selected polymerization technique is photopolymerization. Nonetheless any other method of sensitizing the formulation to photopolymerization upon exposure to ultraviolet radiation is believed suitable for the present photopolymerization process.

The advantages of the preferred photopolymerization process have been found particularly significant in a photopolymerization process in which a relatively thick, multi-layered pressure sensitive adhesive tape is prepared. This preferred embodiment conveniently employs an elongated chamber or tunnel having an upper wall of quartz glass, above which are disposed a plurality, or bank, of lamps providing the chosen source of ultraviolet radiation. If such lamps are the UV-B lamps, or the BLB or BL lamps, described above, they may be conveniently placed from about ½ to about 12 inches above the surface of the formulation being polymerized, and preferably from about 1 to 8 inches above such surface, and more preferably from about 2 to 6 inches above such surface, to provide a uniform exposure to the radiation. The lamps are preferably disposed in a plane parallel to the plane of the tape being made, aligned across the line of travel discussed below, and are at least as long as such tape is wide. If the lamps are longer than the width of the tape, they may be skewed so that most of their effective length is disposed above the tape. Positioned within the chamber is a moveable support surface, which conveniently is a continuous belt. Along the length of the chamber is at least one, and preferably more than one, station equipped for applying a layer of thickened monomer mixture or a layer of prepolymer on the support surface. Preferably such a layer may be applied while the support surface or belt is moving along the chamber. Such stations may simply be provided with a vessel for holding a batch of the formulation, which vessel should have an outlet for the formulation, preferably permitting a controlled amount to continuously flow from the vessel onto the belt. If the belt is moving through the chamber, a doctor blade or similar means may be set adjacent the area at which the formulation is being fed to the belt to form a layer of formulation of predeterminer thickness. Beyond the station are a sufficient number of lamps to photopolymerize the layer, given the speed of the belt. If the station is the second or third or more station in the line, and other materials being photopolymerized are set down at the upstream stations, the layer of fortified acrylic ester pressure sensitive adhesive formulation being so set down would not be applied directly to the belt, but instead to the layers set down and photopolymerized before it.

For such an assembly, where the formulation(s) being polymerized move past the stationary lamps, the speed of movement must be adjusted to the effectiveness or rate at which the layer(s) are polymerized. For each layer, a conversion of about at least 95 percent of the monomer to the polymer is generally desired. For a given lamp, such conversion rate is significantly effected by its distance from the surface of the formulation being polymerized. The length of the chamber between stations (polymerization zone or zones), and the density of lamps within such zone, are also factors which affect the polymerization rate and hence the line speed required. For example, holding the other factors constant, one can increase percent conversion of monomer to polymer by moving the lamps closer to the formulation being polymerized, or by slowing the line speed, or lengthening the polymerization zone, or increasing the density of the lamps within the polymerization zone. In addition, the thickness of the formulation layer is generally a factor, a thicker layer requiring a greater degree of exposure to the ultraviolet radiation to obtain a given percent conversion of monomer to polymer. Where a thick layer is being polymerized in the same assembly as a thinner one, and hence the line speed for each is the same, it is convenient to provide a longer polymerization zone for the thick layer.

A relatively thick supported pressure sensitive adhesive system can conveniently be made using such type of assembly when the support layer is a relatively thick layer formed by photopolymerization within such assembly. The support layer, which itself may have some pressure sensitive adhesive properties, is coated or faced on at least one side with a thinner, and routinely more adhesive, fortified acrylic ester pressure sensitive adhesive layer. Particularly when the support layer is sandwiched between two thinner fortified acrylic ester pressure sensitive adhesive layers, the thick support layer is referred to as a carder layer. Any pressure sensitive adhesive properties it possesses will increase its adherence to the facing layer(s), but the surfaces of such carrier are generally not exposed in the final product and thus its pressure sensitive adhesive properties are not effective at the interface between the pressure sensitive adhesive and the substrate surface. The present invention in broad embodiment does not exclude, however, the use of a carrier or support material that has no pressure sensitive adhesive properties.

In preferred embodiment, the fortified acrylic ester pressure sensitive adhesive is a facing layer of a supported pressure sensitive adhesive system wherein the support layer may be up to about 60 mils thick, and more preferably up to about 50 mils thick. A support or carrier layer having a thickness of from about 25 to 45 mils thickness is of the type that has been found very useful, particularly when faced on both sides with a thinner and more adhesive layer, at least one of which is the fortified acrylic ester pressure sensitive adhesive of the present invention. These types of adhesive systems have been found to possess high performance characteristics as to durability under stress conditions while conforming well to various substrate surfaces, particularly substrate surfaces that are themselves rigid and/or contoured or curved.

In such types of adhesive systems, the thick support layer has been known to include a filler, such as the glass microbubbles disclosed in U.S. Pat. No. 4,223,067 (Levens) mentioned above, or the polymeric solids disclosed in U.S. Pat. No. 4,931,347 (Slovinsky and Tarizzo), issued on Jun. 5, 1990, incorporated hereinto by reference. A suitable filler may also be a silica.

In a thick, double or triple layered adhesive product, the thinner facing layer or layers are preferably from about 1 to about 5 mils thick. The fortified acrylic ester pressure sensitive adhesive might comprise only one of two pressure sensitive adhesive facing layers, the second facing pressure sensitive adhesive layer at times not requiring the fortified adhesion performance characteristics. In such instance the second facing pressure sensitive adhesive layer preferably is polymerized from a pressure sensitive adhesive formulation within the broad guidelines of the present fortified acrylic ester pressure sensitive adhesive formulation but without the inclusion of the organofunctional silane or the polar copolymerizable dimer (which again are described in detail below). Such second facing layer may be comprised in major portion of non-tertiary acrylic acid alkyl esters formed from alcohols having from about 4 to about 12 carbons, and preferably from about 6 to about 10 carbons, particularly the non-tertiary acrylic acid alkyl ester 2-ethylhexyl acrylate. In preferred embodiment, the combination of non-tertiary acrylic acid alkyl ester(s) and polar-moiety containing monomer(s) in the second acrylic ester pressure sensitive adhesive formulation is comprised of from about 55 to about 95 parts by weight of the non-tertiary acrylic acid alkyl ester(s) and from about 5 to about 45 parts by weight of a polar-moiety containing monomer(s), and in more preferred embodiment is comprised of from about 65 to about 90 parts by weight of the non-tertiary acrylic acid alkyl ester(s) and from about 10 to about 35 parts by weight of the polar-moiety-containing monomer(s), particularly when the non-tertiary acrylic acid alkyl esters are the preferred species described above. The possible polar-moiety containing monomers again include acrylic acid, itaconic acid, acrylamide, maleic anhydride, beta-carboxyethylacrylate, acrylonitrile, cyanoethylacrylate, hydroxyalkylacrylates, N-substituted acrylamides, similar methacrylic monomers such as methacrylic acid, methacrylamide, cyanoethylmethacrylate, hydroxyalkylmethacrylate, N-substituted methacrylamides, and the like. Cross-linking agents, particularly di- and triacrylates, may be included, generally in amounts of from about 0.005 to about 0.5 weight percent, based on total weight of polymer in the second acrylic ester pressure sensitive adhesive formulation, and more typically from about 0.01 to about 0.2 weight percent.

The preparation of a thick, triple layered adhesive tape, having filler material in the support center layer, is described in more detail in the following Examples 1–18. Examples 1–8 also include a more detailed description of the preparation of prepolymers that are subsequently polymerized to a high percent conversion of monomer to polymer, although the present invention in broad embodiment is not limited as to the prepolymer preparation method.

The Functional-Organo Silane

The organofunctional silane (also known as functionalorgano silane) is preferably a silane of the Formula I:

Formula I wherein R', R" and R''' are independently each a halo (particularly chloro), methoxy, ethoxy, propoxy, or beta-methoxyethoxy, n is an integer from 0 to about 8 and R'''' is $CH_2\!=\!CH$, $X\!-\!CH_2CH_2$ wherein X is a halogen, particularly chloro, $OCH_2CHCH_2O$

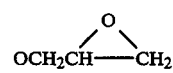

$CH_2\!=\!C(CH_3)\!-\!COOCH_2$, $H_2NCH_2$, $H_2NCH_2$, $H_2NCH_2CH_2NHCH_2$, $HSCH_2$, $CH_2\!=\!CHC_6H_4CH_2$, $H_2NC(O)N(H)CH_2$ and equivalent functional organo radicals. Such functional (reactive) organo radicals thus preferably contain a vinyl, halo, epoxy, acrylate, methacrylate, primary amine, diamine, mercapto, styryl or ureido moiety. In preferred embodiments, the organofunctional silane is vinyl trimethoxysilane or vinyl-tris-(beta-methoxyethoxy)silane, which are available commercially from Union Carbide Corporation under the tradenames respectively of UNION CARBIDE A-171 and -172, or Advanced Polymer, Inc., under the tradenames of KBM-1003 and KBC-1003.

The Dimer

The dimer is within the category of the polar monomers discussed above. It is copolymerizable with the non-tertiary acrylic esters, having ethylenic unsaturation, and has pendant polar functionality. It is a dimer by virtue of the dual carboxylate moieties within a mer unit fraction that includes a single backbone carbon, and preferably has the structure of Formulas II and III as the monomer and the polymer mer unit respectively:

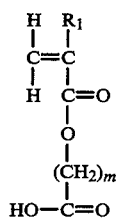

Formula II

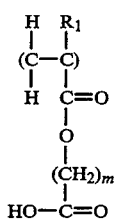

Formula III wherein $R_1$ is hydrogen or a lower alkyl and m is an integer from about 1 to about 4, and preferably from about 2 to about 4. In preferred embodiment the dimer is beta-carboxyethyl acrylate.

Examples 1 to 3 and Comparative Example A

Four adhesive systems comprised of a support layer and two opposed facing layers of pressure sensitive adhesive were prepared by photopolymerization using UV-B lamps as the source of ultraviolet radiation. Such lamps were 20 watt Westinghouse FS-20 lamps which are described further above.

The Support Layer Prepolymer

A formulation for the support layer was prepared by admixing:
- 850 parts by weight 2-ethylhexyl acrylate;
- 120 parts by weight acrylic acid;
- 30 parts by weight octyl/decyl acrylate;
- 20 parts by weight Aerosil 200; and
- 1.0 part by weight Irgacure 184.

This admixture was prepolymerized until a viscosity of from about 1,500 to about 3,000 cps (Brookfield viscometer) was reached, in a reaction vessel with constant agitation. The monomers and vessel were purged with nitrogen prior to the polymerization to remove oxygen, and the prepolymerization was accomplished by exposure to UV-B lamp radiation while the mixture was under constant agitation under a blanket of nitrogen atmosphere. The Aerosil 200 is an amorphous fumed silica, commercially availably under that tradename from Degussa Corp. The octyl/decyl acrylate was a mixture of linear acrylates of $C_8$ and $C_{10}$ alkyl alcohols commercially available from UCB Radcure Inc. The amorphous fumed silica is a type of filler, which here helps to provide an even distribution of the polyvinyl acetate added later. Both of these fillers, the silica and vinyl acetate, arc substantially inert to ultraviolet radiation and do not participate in the photopolymerization.

The Pressure Sensitive Adhesive Layer Prepolymer Base

A base pressure sensitive adhesive formulation for each of Examples 1 to 3 and Comparative Example A was comprised of:
- 8 1.0 parts by weight of 2-ethylhexyl acrylate;
- 2.0 parts by weight of Irgacure 184; and
- 0.0025 parts by weight of D-298 Columbia Blue, a commercially available fluorescent pigment from the Day-Glo Color Corporation.

Additives To The Pressure Sensitive Adhesive Base

Examples 1 to 3 differed from one another and Comparative Example A by the further constituents added to each base formulation set forth above, which were as follows.

EXAMPLE 1

To the base formulation was added 0.25 parts by weight of an vinyltrimethoxy silane, an organofunctional silane available commercially from the Union Carbide Company under the tradename of Union Carbide A-171, and 19.0 parts by weight of beta-carboxyethyl acrylate, a polar copolymerizable dimer available commercially from UCB Radcure Inc. The adhesive system prepared using this fortified acrylic ester pressure sensitive adhesive formulation is referred to at times hereinafter as the "dimer and organofunctional silane" tape.

EXAMPLE 2

To the base formulation was added 19.0 parts by weight of beta-carboxyethyl acrylate, a polar copolymerizable dimer available commercially from UCB Radcure Inc. The adhesive system prepared using this fortified acrylic ester pressure sensitive adhesive formulation is referred to at times hereinafter as the "dimer" tape.

EXAMPLE 3

To the base formulation was added 0.25 parts by weight of an vinyltrimethoxysilane, an organofunctional silane available commercially from the Union Carbide Company under the tradename of Union Carbide A-171. The adhesive system prepared using this fortified acrylic ester pressure sensitive adhesive formulation is referred to at times hereinafter as the "organofunctional silane" tape.

Comparative Example A

No further constituents were added to the base formulation. The adhesive system prepared using this pressure sensitive adhesive formulation is referred to at times hereinafter as the "non-fortified" tape. These admixtures were prepolymerized until viscosities within the preferred range of from about 500 to about 5,000 cps (Brookfield viscometer) were reached, in a reaction vessel with constant agitation in the manner described above with respect to the support layer prepolymer.

Pressure Sensitive Adhesive Tape Completions

The subsequent complete polymerizations of pressure sensitive adhesive tapes of such prepolymers were each carried out on a movable line disposed within an elongated chamber, the upper wall of which was composed of quartz glass. Disposed above such chamber were the bank of UV-B lamps. The chamber had an atmosphere of nitrogen provided by a source of nitrogen that had been first bubbled through a super-cooled isopropanol bath, so that the nitrogen both excluded oxygen from the chamber and acted as a cooling means. The bank of lamps was divided into three polymerization zones, each of which zones were preceded by a station at which a layer of prepolymer was set down on the line. The first zone, the first pressure sensitive adhesive layer zone, was 12 feet long. The second zone, the support layer zone, was 21 feet long. The third zone, the second pressure sensitive adhesive layer zone, was 17 feet long. The lamps were positioned at a density of about two lamps per foot of the line, and disposed centered and parallel to the line of the layers as they moved through the elongated chamber. The entire line, including both the polymerization zones and the stations at which the prepolymer layers were set down, was about 60 feet in length. The prepolymers were set down at the stations on the low-adhesion support belt, or on the upstream layer as the belt moved under the various prepolymer containers. The thickness of the prepolymers layers so formed were determined by doctor blades. The first prepolymer layer, the first pressure sensitive adhesive layer, was formed of the respective pressure sensitive adhesive prepolymer to which was added 1.0 part by weight of Irgacure 184, and the layer set down was 2 mil thick. The support layer, which was set down over the polymerized first pressure sensitive adhesive layer, was formed of the support layer prepolymer to which had been added 1.0 part by weight Irgacure 184 and 100 parts by weight Vinac RP-251. Vinac RP-251 is a polyvinyl acetate used here as a filler and hence the support layer prepolymer was a "filled" layer, and was set down at a thickness of about 34 mils. The third layer, the second pressure sensitive adhesive layer, was set down on top of the polymerized support layer at a thickness of about 2–3 mils. The second pressure sensitive adhesive layer had the same composition as the first pressure sensitive adhesive layer, having been made from the same batch of pressure sensitive adhesive prepolymer for each of Examples 1 to 3 and Comparative Example A. The compositions of both the pressure sensitive adhesive and support layer prepolymers given above, including the materials added after the prepolymerizations, are "batches" of prepolymers prepared for complete polymerization, and the relative amounts prepared in each batch are not indicative of the relative amounts used for a given length of pressure sensitive adhesive system prepared. The lamps were disposed 6 inches above the pressure sensitive adhesive system being polymerized, and the line speed was maintained continuously at 5 ft/min. Sample of each of the pressure sensitive adhesive tapes so prepared were dried for a one hour period at a temperature of 350° F., and then cooled to room temperature and weighed; the loss of weight in such drying was from about 2 to 3 weight percent in each instance. Hence the monomers of the pressure sensitive adhesive tapes were determined to have been convened to polymer to the extent of at least 97 weight percent. In the above examples, cooling is provided by the use of cooled nitrogen gas. Such cooling was determined to hold the temperature in the polymerization zone of the bottom pressure sensitive adhesive layer to about 50° F., and the temperature in the polymerization zone of the filled support layer to about 80°–100° F. The desired maximum temperature will depend upon a number of factors, such as the volatility of the monomers being used, and the means for cooling the reacting formulation may be any of a variety of well known cooling means.

Adhesion Performance Tests

Initial Breakaway and Continuous Peel Tests

A strip of the pressure sensitive adhesive tape (about 150 mm in length) is applied to a primed polyvinyl chloride bar (test bars using XP11-289-A1, Lynn Plastic. The Standard Products Company, Dearborn, Mich., shaped so that it can be gripped by a Tester for pulling away from a painted panel), followed by one pass of a 6.8 kg weighted roller on the taped side. The tape liner is then remove from the tape and the tape, with the polyvinyl chloride bar, is applied to a steel panel coated with an exterior finish automotive paint, followed by two passes (in the same direction) on top of the polyvinyl chloride bar with a 6.8 kg weighted roller. The Tester is aligned for a 90° pull angle upon displacement of a moving platform to which the steel panel is attached. The grip moves at a speed of about 12 inches per minute. The Tester includes a recorder which records force (in Newtons) versus the distance travelled. In this test two parameters are determined. First is the force required to start the breaking of the bonding of the polyvinyl chloride bar to the steel plate, which is called the Peel "breakaway" force or "Initial Breakaway Peel". The second parameter determined is the force needed to continue the breaking of the bond along the length of the bond after initial breakaway, which is called the Peel "continuous" force or "Initial Continuous Peel". The tests are conducted 72 hours after the adhesive bonds are formed by the above-noted roller passes.

Accelerated Aged Breakaway and Continuous Peel Tests

The accelerated aged breakaway peel test and the accelerated aged continuous peel test are conducted in the same manner as described for the initial breakaway and continuous peel tests except that after the bonds are initially formed by the roller passes noted above, they are aged for a seven-day period at 70° C., and then cooled to ambient room temperature for testing.

Pluck Test

The pluck test differs from the peel test generally in that only about one inch length of the pressure sensitive adhesive tape is used and hence only a one inch segment of the polyvinyl chloride bar is bonded to the steel panel. Only one parameter is determined, which is the force in Newtons required to pluck the bar away from the steel panel. The pull of the Tester is again about a 90° angle and the grip is displaced at a speed of about 2.5 cm per minute.

180 Degree Peel Adhesion Test

The 180 degree peel adhesion test is conducted as follow:

(1) An aluminum strip is adhered to the adhesive side of the pressure sensitive adhesive tape that normally is bonded to an automotive trim item, such as an automotive vinyl side molding;

(2) The sample is then applied on its opposite adhesive side to the respective test panel;

(3) The sample is then aged for 24 hours at room temperature;

(4) The sample is then clamped into a tensile testing machine and then is pulled at an 180 degree angle at a rate of 20 inches per minute; and (5) The value of the force required to break the bond is recorded in Newtons per 12.7 mm of width of the sample.

Creep Test

The creep test differs from the peel test in that the polyvinyl bar is attached to the steel panel so as to leave about a 12.7 mm overhang, and then a 72 hour dwell period is allowed, after which a 1000 gram weight is attached to the overhanging section of the bar. The panel is then supported in a vertical position at room temperature. The creep is recorded as the time to failure of the 1000 gram lead. A typical automotive specification is no failure for 96 hours at 158° F. with a maximum slippage of 1.8 min.

The pressure sensitive adhesive tapes prepared as described in Examples 1 to 3 and Comparative Example A above were subjected to the various performance tests described above, using both a standard exterior automotive paint and a silane-modified acrylic/melamine automotive exterior paint. The results of which and various calculated comparisons are set forth in Tables 1 to 4 below.

Tables 1 and 2 show the performance test data for each of the four tapes on respectively the standard automotive paint and the silane-modified automotive paint. Tables 3 and 4 show the "Percent Improvement" calculated for the tapes of each of Examples 1 to 3 on respectively the standard automotive paint and the silane-modified automotive paint. In each instance the "Percent Improvement" was calculated using Equation 1:

Percent Improvement $= (T_A - T_O)/T_O$    Equation 1 wherein $T_A$ is the test result of the additive-containing tape and $T_O$ is the test result for the non-fortified tape for the same test procedure on the same automotive paint. In Tables 1 and 2 the shear strength test results are in minutes and the remaining test results are in Newtons.

TABLE 1

Adhesion Performance (in Newtons except Creep Test)
Adhesion to Standard Automotive Paint Coating

| | Tape Additives | | | |
|---|---|---|---|---|
| Test | None | Dimer and Organo-functional Silane | Dimer | Organo-functional Silane |
| Initial Breakaway Peel | 51.2 | 90.8 | 76.1 | 71.6 |
| Initial Continuous Peel | 16 | 39.2 | 24.5 | 20.5 |
| Accelerated Aged Breakaway Peel | 49.8 | 188.7 | 89 | 75.2 |
| Acceletated Aged Continouos Peel | 30.3 | 76.1 | 33 | 36 |
| Pluck Test | 93.8 | 149.5 | 87.2 | 97 |
| 180 Degree Peel Adhesion | 11.1 | 20 | 15.5 | 16.9 |
| Creep Test (in minutes) | 45 | 4,320 | 960 | 90 |

TABLE 2

Adhesion Performance (in Newtons except Creep Test)
Adhesion to Silane-Modified Automotive Paint Coating

| | Tape Additives | | | |
|---|---|---|---|---|
| Test | None | Dimer and Organo-functional Silane | Dimer | Organo-functional Silane |
| Initial Breakaway Peel | 45.8 | 86.8 | 64.5 | 50.2 |
| Initial Continuous Peel | 16 | 33.4 | 19.6 | 18.2 |
| Accelerated Aged Breakaway Peel | 57 | 115.7 | 115.3 | 92.1 |
| Acceletated Aged Continouos Peel | 24 | 58.3 | 52.9 | 39.2 |
| Pluck Test | 76.5 | 231 | 106.8 | 80.5 |
| 180 Degree Peel Adhesion | 11.1 | 20 | 22.7 | 12.9 |
| Creep Test (in minutes) | 30 | 1,440 | 240 | 45 |

TABLE 3

Percent Improvement Versus Non-fortified Tape
Adhesion to Standard Automotive Paint Coating

| | Tape Additive(s) | | |
|---|---|---|---|
| Test | Dimer and Organofunctional Silane | Dimer | Organo-functional Silane |
| Initial Breakaway Peel | 77% | 49% | 40% |
| Initial Continuous Peel | 145% | 53% | 28% |
| Accelerated Aged Breakaway Peel | 279% | 79% | 51% |
| Acceletated Aged Continuous Peel | 151% | 9% | 19% |
| Pluck Test | 59% | −7% | 3% |
| 180 Degree Peel Adhesion | 80% | 40% | 52% |
| Creep Test | 9,500% | 2,033% | 100% |

TABLE 4

Percent Improvement versus Non-fortified Tape
Adhesion to Silane Modified Acrylic/Melamine Paint Coating

| | Tape Additive(s) | | |
|---|---|---|---|
| Test | Dimer and Organofunctional Silane | Dimer | Organofunctional Silane |
| Initial Breakaway Peel | 90% | 41% | 10% |
| Initial Continuous Peel | 109% | 23% | 14% |
| Accelerated Aged Breakaway Peel | 103% | 102% | 62% |
| Acceletated Aged Continuous Peel | 143% | 120% | 63% |

TABLE 4-continued

Percent Improvement versus Non-fortified Tape
Adhesion to Silane Modified Acrylic/Melamine Paint Coating

| Test | Dimer and Organofunctional Silane | Dimer | Organofunctional Silane |
|---|---|---|---|
| Pluck Test | 202% | 40% | 5% |
| 180 Degree Peel Adhesion | 80% | 104% | 16% |
| Creep Test | 4,700% | 700% | 50% |

EXAMPLES 4 TO 10

Organofunctional Silane Variation

Seven adhesive systems (tapes) comprised of a support layer and two opposed facing layers of pressure sensitive adhesive were prepared by photopolymerization using 12-UV-B lamps as the source of ultraviolet radiation. Such lamps were 20 watt Westinghouse FS-20T lamps which are described further above. All tapes 1.14±0.15 mm thick and 12.7 mm wide.

The Support Layer Prepolymer

The prepolymer for the support layers for each of the tapes was prepared as described above in Examples 1-3.

The Pressure Sensitive Adhesive Layer Prepolymer Base

A base pressure sensitive adhesive formulation for each of Examples 4 to 10 was comprised of:
85.0 parts by weight of 2-ethylhexyl acrylate;
15.0 parts by weight of beta-carboxyethyl acrylate;
2.0 parts by weight of Irgacure 184; and
0.0025 parts by weight of D-298 Columbia Blue, available from the Day-Glo Color Corporation.

Additives To The Pressure Sensitive Adhesive Base

Examples 4 to 10 differed from one another by the specie and/or the amount of organofunctional silane added to each base formulation set forth above, which were as follows.

EXAMPLE 4

0.10 parts by weight of a vinyl trimethoxy silane available commercially from the Union Carbide Company under the tradename of Union Carbide A-171;

EXAMPLE 5

0.25 parts by weight of a vinyl trimethoxy silane available commercially from the Union Carbide Company under the tradename of Union Carbide A-171;

EXAMPLE 6

0.25 parts by weight of a gamma-glycidoxypropyl trimethoxy silane available commercially from the Union Carbide Company under the tradename of Union Carbide A-187;

EXAMPLE 7

0.25 parts by weight of a vinyl trimethoxy silane available commercially from the Union Carbide Company under the tradename of Union Carbide A-171 and 0.25 parts by weight of a gamma-glycidoxypropyl trimethoxy silane available commercially from the Union Carbide Company under the tradename of Union Carbide A-187;

EXAMPLE 8

0.50 parts by weight of a vinyl trimethoxy silane available commercially from the Union Carbide Company under the tradename of Union Carbide A-171;

EXAMPLE 9

0.70 parts by weight of a vinyl trimethoxy silane available commercially from the Union Carbide Company under the tradename of Union Carbide A-171; and

EXAMPLE 10

0.25 parts by weight of a gamma-amino propyl triethoxy silane available commercially from the Union Carbide Company under the tradename of Union Carbide A-1100.

Pressure Sensitive Adhesive Tape Completions

The subsequent complete polymerizations of pressure sensitive adhesive tapes of such prepolymers were each carried out as described above for Examples 1 to 3.

Adhesion Performance Tests

The pressure sensitive adhesive tapes prepared as described in Examples 4 to 10 above were subjected to the Initial Breakaway and Continuous Peel Tests and the Pluck performance tests (described above in Examples 1 to 3) for bonding to a silane-modified acrylic/melamine automotive exterior paint. The tests results and an abbreviated description of the organofunctional silane additive are set forth below in Table 5.

TABLE 5

Organofunctional Silane Variations

| Example | Organofunction Silane (Formula 1 Substitiuents and Amount) | | | | Test Results (Newtons) | | |
|---|---|---|---|---|---|---|---|
| | R"" | "n" of $(CH_2)_n$ | Each of R', R"& R"' | Amount (parts by wt.) | Initial Breakaway Peel | Initial Continuous Peel | Pluck |
| 4 | vinyl | 0 | methoxy | 0.1 | 69.0 | 17.8 | 106.8 |
| 5 | vinyl | 0 | methoxy | 0.3 | 78.8 | 26.7 | 121.9 |
| 6 | glycidoxy | 3 | methoxy | 0.3 | 77.0 | 24.9 | 93.9 |
| 7 (two silanes) | vinyl | 0 | methoxy | 0.3 | 55.6 | 25.8 | 86.3 |
| | glycidoxy | 3 | methoxy | 0.3 | | | |
| 8 | vinyl | 0 | methoxy | 0.5 | 55.6 | 16.9 | 146.0. |
| 9 | vinyl | 0 | methoxy | 0.7 | 72.1 | 16.9 | 147.7 |
| 10 | aminomethyl | 2 | ethoxy | 0.3 | 61.0. | 19.1 | 158.0. |

EXAMPLES 11 TO 18

Dimer/2-EHA Variation

Eight adhesive systems (tapes) comprised of a support layer and two opposed facing layers of pressure sensitive adhesive were prepared by photopolymerization using 12-UV-B lamps as the source of ultraviolet radiation. Such lamps were 20 watt Westinghouse FS-20T lamps which are described further above. All tapes 1.14±0.15 mm thick and 12.7 turn wide.

The Support Layer Prepolymer

The prepolymer for the support layers for each of the tapes was prepared as described above in Examples 1-3.

The Pressure Sensitive Adhesive Layer Prepolymer Base

A base pressure sensitive adhesive formulation for each of Examples 11 to 18 was comprised of:

100.0- b parts by weight of 2-ethylhexyl acrylate;
b parts by weight beta-carboxyethyl acrylate combined;
2.0 parts by weight of Irgacure 184; and
0.0025 parts by weight of D-298 Columbia Blue, available from the Day-Glo Color Corporation. Examples 11 to 18 differed from one another by the extent the beta-carboxyethyl acrylate was substituted for the 2-ethylhexyl acrylate, which ranged from 0 to 25 weight percent based on a total of 100 parts by weight of these specie(s), as set forth below:

EXAMPLE 11

0.0 parts by weight of the beta-carboxyethyl acrylate and 100.0 parts by weight of the 2-ethylhexyl acrylate;

EXAMPLE 12

5.0 parts by weight of the beta-carboxyethyl acrylate and 95.0 parts by weight of the 2-ethylhexyl acrylate;

EXAMPLE 13

10.0 pain by weight of the beta-carboxyethyl acrylate and 90.0 parts by weight of the 2-ethylhexyl acrylate;

EXAMPLE 14

15.0 parts by weight of the beta-carboxyethyl acrylate and 85.0 parts by weight of the 2-ethylhexyl acrylate;

EXAMPLE 15

19.0 parts by weight of the beta-carboxyethyl acrylate and 81.0 parts by weight of the 2-ethylhexyl acrylate;

EXAMPLE 16

20.0 parts by weight of the beta-carboxyethyl acrylate and 80.0 parts by weight of the 2-ethylhexyl acrylate;

EXAMPLE 17

22.0 parts by weight of the beta-carboxyethyl acrylate and 78.0 parts by weight of the 2-ethylhexyl acrylate; and

EXAMPLE 18

25.0 parts by weight of the beta-carboxyethyl acrylate and 75.00 parts by weight of the 2-ethylhexyl acrylate;

Pressure Sensitive Adhesive Tape Completions

The subsequent complete polymerizations of pressure sensitive adhesive tapes of such prepolymers were each carried out as described above for Examples 1 to 3.

Adhesion Performance Tests

The pressure sensitive adhesive tapes prepared as described in Examples 11 to 18 above were subjected to the Initial Breakaway and Continuous Peel Tests and the Pluck performance tests (described above in Examples 1 to 3) for bonding to a silane-modified acrylic/melamine automotive exterior paint. The tests results and an abbreviated description of the organofunctional silane additive are set forth below in Table 6. The test result values given for Example 18 were averages of tests performed on tapes prepared from eight separate adhesive tape prepolymer batches because at the high dimer loading performance characteristics variations were seen from batch to batch. Of the eight tape samples tested in Example 18, the breakaway peel values varied from 50.7 to 72.1, the continuous peel values varied from 12.5 to 20.5, and the pluck values varied from 80.5 to 138.0.

TABLE 6

| | Dimer/2-EHA Variations | | | | |
|---|---|---|---|---|---|
| | | 2-EHA | Test Results (Newtons) | | |
| Example | Dimer Amount (parts by wt.) | Amount (parts by wt.) | Initial Breakaway Peel | Initial Continuous Peel | Pluck |
| 11 | 0.0 | 100.0 | 71.2 | 16.9 | 121.9 |
| 12 | 5.0 | 95.0 | 65.0. | 17.8 | 113.5 |
| 13 | 10.0 | 90.0 | 60.1 | 10.2 | 101.0. |
| 14 | 15.0 | 85.0 | 65.4 | 22.7 | 122.4 |
| 15 | 19.0 | 81.0 | 74.8 | 15.6 | 129.1 |
| 16 | 20.0 | 80.0 | 63.6 | 13.8 | 94.8 |
| 17 | 22.0 | 78.0 | 58.3 | 14.2 | 119.7 |
| 18 | 25.0 | 75.0 | 62.4 | 16.5 | 117.5 |

In an embodiment, the present invention provides a pressure sensitive adhesive comprised of a polymerization product of, or a polymeric composition comprised of mer units derived from, a formulation comprising at least one non-tertiary acrylic acid alkyl ester formed from a primary or secondary alcohol, an organofunctional silane, wherein the organofunctional silane is present in the formulation in an amount sufficient to increase the adhesive characteristics of the pressure sensitive adhesive, a ethylenically-unsaturated dimer, wherein the ethylenically-unsaturated dimer is present in the formulation in an amount sufficient to increase the adhesive characteristics of the pressure sensitive adhesive, and optionally a non-dimer ethylenically-unsaturated monomer having a polar group.

In preferred embodiment, in the pressure sensitive adhesive the primary or secondary alcohol has from about 4 to about 12 carbons. In preferred embodiment, the primary or secondary alcohol has from about 6 to about 10 carbons. In preferred embodiment, the formulation contains from about 55 to about 99 parts by weight of the non-tertiary acrylic acid alkyl ester and from about 1 to about 45 parts by weight of the ethylenically-unsaturated dimer. In preferred embodiment, the formulation contains from about 55 to about 99 parts by weight of the non-tertiary acrylic acid alkyl ester and from about 1 to about 45 parts by weight of the ethylenically-unsaturated dimer and from about 0 to about 44 parts by weight of the optional non-dimer ethylenically-unsaturated monomer having a polar group, provided the ethylenically-unsaturated dimer.

In preferred embodiment, the formulation contains from about 55 to about 99 parts by weight of the non-tertiary acrylic acid alkyl ester and from about 5 to about 30 parts by weight of the ethylenically-unsaturated dimer, and wherein the ethylenically-unsaturated dimer has the structure of Formula II above wherein $R_1$ is hydrogen or a lower alkyl and m is an integer from about 2 to about 4. In preferred embodiment, the formulation contains from about 55 to about 99 parts by weight of the non-tertiary acrylic acid alkyl ester and from about 0.01 to about 5 parts by weight of the organofunctional silane, and the organofunctional silane has the structure of Formula I wherein R', R" and R'" are independently each a methoxy, ethoxy, propoxy, or beta-methoxyethoxy, n is an integer from 0 to about 8 and R"" is $CH_2=CH$, $X—CH_2CH_2$ wherein X is a halogen, particularly chloro, $OCH_2CHCH_2O$, $CH_2=CHCOOCH_2$, $CH_2=C(CH_3)—COOCH_2$, $H_2NCH_2$, $H_2NCH_2CH_2NHCH_2$, $HSCH_2$, $CH_2=CHC_6H_4CH_2$, $H_2NC(O)N(H)CH_2$ or mixtures and combinations thereof.

In preferred embodiment, the formulation contains from about 55 to about 99 parts by weight of the non-tertiary acrylic acid alkyl ester, from about 10 to about 25 parts by weight of the ethylenically-unsaturated dimer and from about 0.1 to about 1.55 parts by weight of the organofunctional silane, and the ethylenically-unsaturated dimer has the structure of Formula II and the organofunctional silane has the structure of Formula I.

In preferred embodiment, the formulation is a photopolymerization product and the formulation further includes an amount of a photoinitiator sufficient for an effective photopolymerization to a 95 weight percent conversion of monomer to polymer, and optionally a sufficient amount of an organic colorant to provide a visible degree of color to a prepolymer of the formulation.

In an embodiment, the present invention provides a pressure sensitive adhesive comprised of a polymerization product of a formulation comprising at least one non-tertiary acrylic acid alkyl ester formed from a primary or secondary alcohol, an organofunctional silane, wherein the organofunctional silane is present in the formulation in an amount sufficient to increase the adhesive characteristics of the pressure sensitive adhesive, optionally an ethylenically-unsaturated dimer, and optionally a non-dimer ethylenically-unsaturated monomer having a polar group. In preferred embodiment, the formulation contains from about 55 to about 99 parts by weight of the non-tertiary acrylic acid alkyl ester and from about 0.01 to about 5 parts by weight of the organofunctional silane, and wherein the organofunctional silane has the structure of Formula I above wherein R', R" and R'" are independently each a methoxy, ethoxy, propoxy, or beta-methoxyethoxy, n is an integer from 0 to about 8 and R"" is $CH_2=CH$, $X—CH_2CH_2$ wherein X is halogen, particularly chloro, $OCH_2CHCH_2O$, $CH_2=CHCOOCH_2$, $CH_2=C(CH_3)—COOCH_2$, $H_2NCH_2$, $H_2NCH_2CH_2NHCH_2$, $HSCH_2$, $CH_2=CHC_6H_4CH_2$, $H_2NC(O)N(H)CH_2$ or mixtures and combinations thereof. In preferred embodiment, the formulation contains from about 55 to about 99 parts by weight of the non-tertiary acrylic acid alkyl ester and from about 0.1 to about 1.55 parts by weight of the organofunctional silane. In preferred embodiment, the organofunctional silane is vinyltrimethoxysilane, vinyltris(2-methoxyethoxy)silane or combinations thereof. In preferred embodiment, the formulation contains from about 55 to about 99 parts by weight of the non-tertiary acrylic acid alkyl ester and from about 5 to about 30 parts by weight of the ethylenically-unsaturated dimer, and wherein the ethylenically-unsaturated dimer has the structure of Formula II above wherein $R_1$ is hydrogen or a lower alkyl and m is an integer from about 2 to about 4.

In preferred embodiment, the formulation contains from about 55 to about 99 parts by weight of the non-tertiary acrylic acid alkyl ester, from about 10 to about 25 parts by weight of the ethylenically-unsaturated dimer. In preferred embodiment, the ethylenically-unsaturated dimer is substantially beta-carboxyethyl acrylate.

The present invention in an embodiment provides a pressure sensitive adhesive system comprised of a support layer faced on at least one side with a layer of a pressure sensitive adhesive comprised of a polymerization product of a formulation comprising at least one non-tertiary acrylic acid alkyl ester formed from a primary or secondary alcohol, an organofunctional silane, wherein the organofunctional silane is present in the formulation in an amount sufficient to increase the adhesive characteristics of the pressure sensitive adhesive and/or an ethylenically-unsaturated dimer, wherein the ethylenically-unsaturated dimer is present in the formulation in an amount sufficient to increase the adhesive characteristics of the pressure sensitive adhesive, and optionally a non-dimer ethylenically-unsaturated monomer having a polar group.

In preferred embodiment, the support layer is from about 20 to about 60 mils thick and is comprised of from about 80 to about 140 parts by weight of at least one non-tertiary acrylic acid alkyl ester formed from a primary or secondary alcohol, the primary or secondary alcohol having from about 4 to about 12 carbons and from about 80 to about 140 parts by weight of an ethylenically-unsaturated monomer having a polar group, and wherein the layer of a pressure sensitive adhesive is from about 1 to about 5 mils thick.

The present invention in an embodiment provides a pressure sensitive adhesive system comprised of a support layer faced on at least one side with a layer of a pressure sensitive adhesive comprised of a polymerization product of a formulation comprising at least one non-tertiary acrylic acid alkyl ester formed from a primary or secondary alcohol, an organofunctional silane, wherein the organofunctional silane is present in the formulation in an amount sufficient to increase the adhesive characteristics of the pressure sensitive adhesive and/or an ethylenically-unsaturated dimer, wherein the ethylenically-unsaturated dimer is present in the formulation in an amount sufficient to increase the adhesive characteristics of the pressure sensitive adhesive, and optionally a non-dimer ethylenically-unsaturated rnonorner having a polar group.

In preferred embodiment, the support layer is from about 20 to about 60 mils thick and is comprised of from about 80 to 140 parts by weight of at least one non-tertiary acrylic acid alkyl ester formed from a primary or secondary alcohol, the primary or secondary alcohol having from about 4 to about 12 carbons and from about 80 to about 140 parts by weight of an ethylenically-unsaturated monomer having a polar group, and wherein the layer of a pressure sensitive adhesive is from about 1 to about 5 mils thick.

In an embodiment the present invention provides a process for the preparation of a pressure sensitive adhesive system comprising photopolymerizing a pressure-sensitive-adhesive formulation comprising at least one non-tertiary acrylic acid alkyl ester formed from a primary or secondary alcohol, an organofunctional silane, wherein the organofunctional silane is present in the formulation in an amount sufficient to increase the adhesive characteristics of the pressure sensitive adhesive and/or an ethylenically-unsaturated dimer, wherein the ethylenically-unsaturated dimer is present in the formulation in an amount sufficient to increase the adhesive characteristics of the pressure sensitive adhesive, a sufficient amount of a photoinitiator to provide photopolymerization, and optionally a non-dimer ethylenically-unsaturated monomer having a polar group.

In preferred embodiment, the process further includes the step of photopolymerizing a support-layer formulation to form a support layer from about 20 to about 60 mils thick, wherein the support-layer formulation is comprised of from about 80 to 140 parts by weight of at least one non-tertiary acrylic acid alkyl ester formed from a primary or secondary alcohol, the primary or secondary alcohol having from about 4 to about 12 carbons, and from about 80 to about 140 parts by weight of an ethylenically-unsaturated monomer having a polar group, then overlaying the support layer with a layer of the pressure-sensitive-adhesive formulation, wherein the layer of a pressure sensitive adhesive is from about 1 to about 5 mils thick, and then photopolymerizing the pressure-sensitive-adhesive formulation.

When a word herein appears with a parenthesis about a syllable thereof, it designates alternative terms. For instance the term "polymer(s)" is used to designate the phrase "polymer and/or polymers". Unless specified otherwise herein, all percentages are percentages by weight.

Industrial Applicability of the Invention

The present invention is applicable to the adhesive industry, the coatings industry and particularly to the automotive industry.

We claim:

1. A multi-layer pressure sensitive adhesive system comprised of:
   a support layer having on at least one side a facing layer of a pressure sensitive adhesive, said pressure sensitive adhesive being comprised of a polymerization product of a formulation comprising:
   at least one non-tertiary acrylic acid alkyl ester formed from a primary or secondary alcohol;
   optionally an organofunctional silane in an amount sufficient to increase the adhesive characteristics of said pressure sensitive adhesive,
   an ethylenically-unsaturated dimer in an amount sufficient to increase the adhesive characteristics of said pressure sensitive adhesive; and
   optionally a non-dimer ethylenically unsaturated monomer having a polar group;
   wherein said ethylenically-unsaturated dimer has the structure of Formula II:

Formula II wherein $R_1$ is hydrogen and m is an integer of about 2.
   wherein said support layer is from about 20 to about 60 mils thick; and
   wherein said facing layer is from about 1 to about 5 mils thick.

2. The multi-layer pressure sensitive adhesive system of claim 1 wherein said support layer is comprised of a polymerization product of from about 80 to 140 parts by weight of at least one non-tertiary acrylic acid alkyl ester formed from a primary or secondary alcohol, said primary or secondary alcohol having from about 4 to about 12 carbons and from about 80 to about 140 parts by weight of an ethylenically unsaturated monomer having a polar group.

3. The multi-layer pressure sensitive adhesive system of claim 1 wherein said primary or secondary alcohol has from about 6 to about 10 carbons.

4. The multi-layer pressure sensitive adhesive system of claim 1 wherein said formulation contains from about 55 to about 99 parts by weight of said non-tertiary acrylic acid alkyl ester and from about 1 to about 45 parts by weight of said ethylenically-unsaturated dimer.

5. The multi-layer pressure sensitive adhesive system of claim 1 wherein said formulation contains from about 55 to about 99 parts by weight of said non-tertiary acrylic acid alkyl ester and from about 1 to about 45 parts by weight of said ethylenically-unsaturated dimer and from about 0 to about 44 parts by weight of said optional non-dimer ethylenically unsaturated monomer having a polar group.

6. The multi-layer pressure sensitive adhesive system of claim 1 wherein said formulation contains from about 55 to about 99 parts by weight of said non-tertiary acrylic acid alkyl ester and from about 5 to about 30 parts by weight of said ethylenically-unsaturated dimer.

7. The multi-layer pressure sensitive adhesive system of claim 1 wherein said organofunctional silane has the structure of Formula I:

Formula I wherein R', R" and R"' are independently each a methoxy, ethoxy, propoxy, or beta-methoxyethoxy, n is an integer from 0 to about 8 and R"" is CH$_2$=CH. X—CH$_2$CH$_2$ wherein X is a halogen,

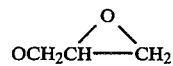

$CH_2=CHCOOCH_2$, $CH_2=C(CH_3)-COOCH_2$, $H_2NCH_2$, $H_2NCH_2CH_2NHCH_2$, $HSCH_2$, $CH_2=CHC_6H_4CH_2$, or $H_2NC(O)N(H)CH_2$.

8. The multi-layer pressure sensitive adhesive system of claim 1 wherein said formulation contains from about 55 to about 99 parts by weight of said non-tertiary acrylic acid alkyl ester and from about 0.01 to about 5 parts by weight of said organofunctional silane.

9. The multi-layer pressure sensitive adhesive system of claim 1 wherein said formulation contains from about 55 to about 99 parts by weight of said non-tertiary acrylic acid alkyl ester, from about 10 to about 25 parts by weight of said ethylenically-unsaturated dimer and from about 0.1 to about 1.55 parts by weight of said organofunctional silane.

10. The multi-layer pressure sensitive adhesive system of claim 1 wherein said formulation contains from bout 55 to about 99 parts by weight of said non-teriary acrylic acid alkyl ester, from about 0.0 1 to about 5 parts by weight of said organofunctional silane and from about 5 to about 30 parts by weight of said ethylenically-unsaturated dimer.

11. The multi-layer pressure sensitive adhesive system of claim 1 wherein said formulation is a photopolymerization product, said formulation further includes an amount of a photoinitiator sufficient for an effective photopolymerization to at least a 95 weight percent conversion of monomer to polymer, and said formulation optionally contains an organic colorant in an amount sufficient to provide a visible degree of color to a prepolymer of said formulation.

12. A multi-layer pressure sensitive adhesive system comprised of:
   a support layer having on at least one side a facing layer of a pressure sensitive adhesive, said pressure sensitive adhesive being comprised of a polymerization product of a formulation comprising:
      from about 55 to about 99 parts by weight of a non-tertiary acrylic acid alkyl ester, from about 1 to about 45 parts by weight of an ethylenically-unsaturated dimer and from about 0.01 to about 5 parts by weight of an organofunctional silane;
   wherein said support layer is from about 20 to about 60 mils thick; and
   wherein said facing layer is from about 1 to about 5 mils thick;
   wherein said organofunctional silane has the structure of Formula I:

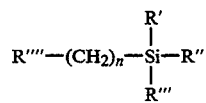

Formula I wherein R', R" and R'" are independently each a methoxy, ethoxy, propoxy, or beta-methoxyethoxy, n is an integer from 0 to about 8 and R"" is $CH_2=CH$, $X-CH_2CH_2$ wherein X is a halogen,

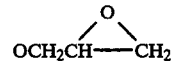

$CH_2=CHCOOCH_2$, $CH_2=C(CH_3)-COOCH_2$, $H_2NCH_2$, $H_2NCH_2CH_2$ $NHCH_2$, $HSCH_2$, $CH_2=CHC_6H_4CH_2$, or $H_2NC(O)N(H)CH_2$, and wherein said ethylenically-unsaturated dimer has the structure of Formula II:

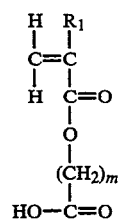

Formula II wherein $R_1$ is hydrogen and m is an integer of about 2.

13. The multi-layer pressure sensitive adhesive system of claim 12 wherein said support layer is comprised of a polymerization product of from about 80 to 140 parts by weight of at least one non-tertiary acrylic acid alkyl ester formed from a primary or secondary alcohol, said primary or secondary alcohol having from about 4 to about 12 carbons and from about 80 to about 140 parts by weight of an ethylenically unsaturated monomer having a polar group.

14. The multi-layer pressure sensitive adhesive system of claim 13 wherein said formulation is a photopolymerization product, said formulation further includes an amount of a photoinitiator sufficient for an effective photopolymerization to at least a 95 weight percent conversion of monomer to polymer, and said formulation optionally contains an organic colorant in an amount sufficient to provide a visible degree of color to a prepolymer of said formulation.

* * * * *

UNITED STATES PATENT AND TRADEMARK OFFICE
CERTIFICATE OF CORRECTION

PATENT NO. : 5,354,600
DATED : October 11, 1994            Page 1 of 2
INVENTOR(S) : Fisher et al.

It is certified that error appears in the above-identified patent and that said Letters Patent is hereby corrected as shown below:

In column 1, line 28, delete "rail" and substitute therefor -- mil --.

In column 2, line 50, delete "untilled" and substitute therefor -- unfilled --.

In column 2, line 53, delete "untilled" and substitute therefor -- unfilled --.

In column 6, line 62, after "("topcoat")", delete "my" and substitute therefor -- may --.

In column 7, line 30, delete "arc" and substitute therefor -- are --.

In column 7, line 37, delete "arc" and substitute therefor -- are --.

In column 7, line 40, delete "FS40" and substitute therefor -- FS-40 --.
In column 7, line 48, "mount" should read --amount--.
In column 7, line 40, delete "Imps" and substitute therefor -- lamps --.

In column 7, line 48, delete "Of" and substitute therefor -- of --.

In column 13, line 23, delete "carder" and substitute therefor -- carrier --.

UNITED STATES PATENT AND TRADEMARK OFFICE
CERTIFICATE OF CORRECTION

PATENT NO. : 5,354,600

DATED : October 11, 1994      Page 2 of 2

INVENTOR(S) : Fisher et al.

It is certified that error appears in the above-identified patent and that said Letters Patent is hereby corrected as shown below:

In column 18, line 1, delete "convened" and substitute therefor --converted--.

In column 26, lines 67-68, delete "rnonorner" and substitute therefor
-- monomer --.

In column 28, line 62, which is line 9 of Claim 7, delete " $CH_2=CH.$ " and
substitute therefor -- $CH_2=CH,$ --.

Signed and Sealed this

Thirteenth Day of December, 1994

Attest:

BRUCE LEHMAN

*Attesting Officer*      *Commissioner of Patents and Trademarks*